US012809948B2

(12) United States Patent
Schneider

(10) Patent No.: US 12,809,948 B2
(45) Date of Patent: Nov. 24, 2026

(54) ANTI-LEARNING FOR DIGITAL CONTENT PROTECTION AND RIGHTS MANAGEMENT

(71) Applicant: Daniel Schneider, Los Angeles, CA (US)

(72) Inventor: Daniel Schneider, Los Angeles, CA (US)

( * ) Notice: Subject to any disclaimer, the term of this patent is extended or adjusted under 35 U.S.C. 154(b) by 85 days.

(21) Appl. No.: 18/644,072

(22) Filed: Apr. 23, 2024

(65) Prior Publication Data

US 2026/0003940 A1 Jan. 1, 2026

(51) Int. Cl.

*G06F 21/10* (2013.01)
*G06N 20/00* (2019.01)
*H04L 9/08* (2006.01)

(52) U.S. Cl.

CPC ........... *G06F 21/107* (2023.08); *G06N 20/00* (2019.01); *H04L 9/0819* (2013.01)

(58) Field of Classification Search

CPC ...... G06F 21/107; G06N 20/00; H04L 9/0819
See application file for complete search history.

(56) References Cited

U.S. PATENT DOCUMENTS

2020/0184036 A1* 6/2020 Wu ........................ G06F 21/604
2023/0088588 A1* 3/2023 Habiba ............... G06F 21/6245 713/189
2023/0325678 A1* 10/2023 Fradkin .................... G06N 3/09 706/25
2024/0195826 A1* 6/2024 Mathews ............... G06N 20/20
2024/0273184 A1* 8/2024 Yarabolu ................. G06F 21/55

* cited by examiner

*Primary Examiner* — Techane Gergiso
(74) *Attorney, Agent, or Firm* — OMNIVAULT LLC

(57) ABSTRACT

An embodiment receives a first original dataset. The embodiment modifies the first original dataset to create a first poisoned dataset. The embodiment obtains a delta between the first original dataset and the first poisoned dataset. The embodiment encrypts the delta to create an encrypted delta and a corresponding encryption key. The embodiment decrypts, using the encryption key, the encrypted delta to create a decrypted delta. The embodiment reverts, using the decrypted delta, the first poisoned dataset into the first original dataset.

20 Claims, 7 Drawing Sheets

500

ANTI-LEARNING FOR DIGITAL CONTENT PROTECTION AND RIGHTS MANAGEMENT

CROSS-REFERENCE TO RELATED APPLICATION

The present application is a Non-Provisional U.S. Patent Application which claims the benefit of U.S. Provisional Patent Application No. 63/486,639, filed Feb. 23, 2023. The disclosures of all of the above-noted applications are hereby incorporated by reference in their entireties into the present application.

TECHNICAL FIELD

The present invention generally relates to cybersecurity. More specifically, the present invention includes systems and methods for preventing unauthorized utilization of data for training a computer model.

BACKGROUND

In the dawn of significant advancements in Machine Learning ("ML") and Artificial intelligence ("AI") technologies, data has become increasingly commoditized. While the legal, cultural, and technological awareness of intellectual copyright are largely and long understood, there is not yet a similar analog to copy protection for authorization of content use in training Machine Learning ("ML") Neural Networks. This presents itself both in terms of ethical consideration of creators' desired use cases to potential reproduction of protected property. Currently usage of images for neural network training goes largely untethered beyond policies.

In the past, certain techniques were employed to prevent unauthorized copying of media stored on physical mediums. For example, floppy disks oftentimes contained deliberate track errors that prevented unauthorized copying of media stored on them. As another example, during the Cold War, communication transmissions included inaudible high frequency noise that would disrupt analog recording devices and interfere with recording the transmissions. Currently, there is a need for a method that would prevent the unauthorized use of data for training neural networks, analogous to the way that past techniques were employed to prevent unauthorized copying and recording.

In recent years, there has been an explosion of Artificial Intelligence ("AI") applications incorporating Machine Learning ("ML") directed towards producing generative art. Generative art refers to art that in whole or in part has been created with the use of an autonomous system. An autonomous system in this context is generally one that is non-human and can independently determine features of an artwork that would otherwise require decisions made directly by the artist. Nowadays there exist a multitude of different software tools that enable any user to create AI generated art simply by typing a few words.

Machine Learning ("ML") works by training models on data sets to uncover relationships between data that may have been previously unknowable by a human observer. Further, ML involves training a model from patterns in data, exploring a space of possible models defined by parameters.

With the current explosion of AI generated art, a major problem remains: artists can not adequately protect themselves from unauthorized use of their creative products for training ML Neural Networks that will ultimately exploit their intellectual property. The unauthorized use of data for machine learning is a major problem in the advent of AI generated art.

An embodiment of the present disclosure is aimed towards solving the problem of unauthorized use of data for use in ML Neural Networks. Some such embodiments include intentionally introducing perturbation into an original data set to create a poisoned data set, wherein the poisoned data set may only be reverted to the original data set by entering a cryptographically encoded license-key to remove the perturbation from the poisoned data set.

SUMMARY OF THE INVENTION

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter. The present invention is defined by the claims.

An embodiment of the present disclosure includes a method of intentional data poisoning for anti-learning and digital content theft prevention. An embodiment includes acquiring an input data set from a user. An embodiment also includes manipulating the input data set, thereby creating a poisoned data set. An embodiment also includes obtaining a delta between the poisoned data set and the input data set. An embodiment also includes encrypting the delta.

An embodiment also includes generating a key to decrypt the delta, wherein decrypting the delta will enable the method to revert the poisoned data set back into the input data set. An embodiment also includes sending the key to a user device. An embodiment also includes receiving the key by the user device. An embodiment also includes decrypting the using the key received by the user device. An embodiment also includes reverting the poisoned data set to the input data set using the decrypted delta.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

An embodiment disclosed herein also includes a digital content rights and management system, the system comprising a network, a content creator device, an authorized user device, a poisoning device, a license-key generator, and a license-key management device.

In a particular embodiment, the poisoning device comprises a processor, a memory, and a set of instructions stored on the memory that when executed by the processor cause the poisoning device to acquire an input data from the content creator device, manipulate the input data, thereby creating poisoned data, obtain a delta between the poisoned data and the input data, and encrypt the delta.

In a particular embodiment, the license-key generator is configured to generate a license-key to decrypt the delta, wherein decrypting the delta will allow a user to revert the poisoned data back into the input data. In a particular embodiment, the license-key management device is configured to send the license-key to the authorized user device. In a particular embodiment, the authorized user device is configured to decrypt the delta upon receiving the license-key. In a particular embodiment, the authorized user device is configured to revert the poisoned data to the input data using the decrypted delta.

The foregoing has outlined rather broadly the features and technical advantages of the present invention in order that the detailed description of the invention that follows may be better understood. Additional features and advantages of the invention will be described hereinafter that form the subject of the claims of the invention.

It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The following drawings are intended to serve as example embodiments of the features disclosed in the present disclosure.

DETAILED DESCRIPTION OF DRAWINGS

Figure 1:
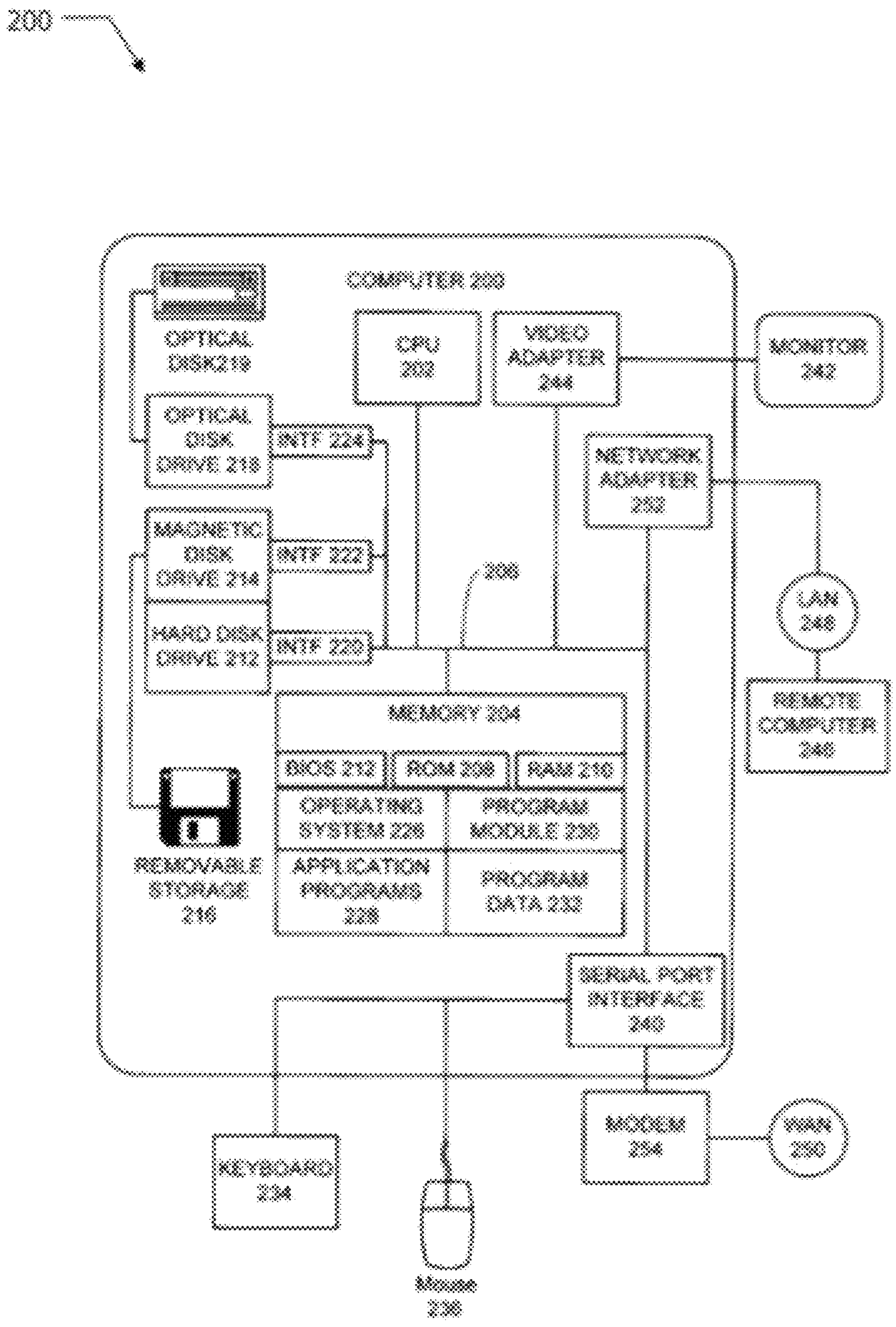
FIG. 1 is a diagram of an example programmable processing system utilized as the various computing components described herein used to implement an embodiment of the present invention.

This application generally relates to cybersecurity. More specifically, this application includes a computer system and technique aimed towards preventing the unauthorized use of data for machine learning purposes.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In describing embodiments of the present invention, the following terminology will be used. The singular forms "a," "an," and "the" include plural referents unless the context clearly dictates otherwise. Thus, for example, reference to "a needle" includes reference to one or more of such needles and "etching" includes one or more of such steps. As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. As used herein, the singular forms "a," "an," and "the" are intended to include the plural forms as well, unless the context clearly indicates otherwise.

It further will be understood that the terms "comprises," "comprising," "includes," and "including" specify the presence of stated features, steps or components, but do not preclude the presence or addition of one or more other features, steps or components. It also should be noted that in some alternative implementations, the functions and acts noted may occur out of the order noted in the figures. For example, two figures shown in succession may in fact be executed substantially concurrently or may sometimes be executed in the reverse order, depending upon the functionality and acts involved.

As used herein, the term "about" means that dimensions, sizes, formulations, parameters, shapes, and other quantities and characteristics are not and need not be exact, but may be approximated and/or larger or smaller, as desired, reflecting tolerances, conversion factors, rounding off, measurement error and the like, and other factors known to those of skill. Further, unless otherwise stated, the term "about" shall expressly include "exactly," consistent with the discussion above regarding ranges and numerical data.

The term "mobile application" refers to an application executing on a mobile device such as a smartphone, tablet, and/or web browser on any computing device.

The terms "customer," "client," and "user" refer to an entity, e.g. a human being, an automated agent, an agent working on behalf of a human, a robot, and/or any human or non-human being using the "DunceHat" anti-learning method, including any software or smart device application (s) associated with embodiments of the invention. The term "user" (and like-terms) herein refers to one or more users.

The term "data mining" refers to the process of extracting and discovering patterns in large data sets involving methods that may utilize machine learning, statistics, and database systems. The terms "web scraping", "scraping", "web harvesting", and "web data extraction" may be used interchangeably, and all refer to collecting data from the internet by means of extracting data from websites. Web scraping software may directly access the World Wide Web using the Hypertext Transfer Protocol or a web browser. Further, web scraping may be employed in order to gather data for use in data mining.

The term "data perturbation" or simply "perturbation" refers to a data security technique that adds noise to data. The term "noise" refers to additional meaningless data/information that is introduced to data. Accordingly, "noisy" data are data that is corrupted, distorted, or has a low signal-to-noise ratio. Improper procedures to subtract out the noise in data can lead to a false sense of accuracy or false conclusions.

The term "data poisoning" may refer to the introduction of additional data to a data structure, causing the data structure to produce anomalous output when used as part of a training data set. Further, data poisoning may likewise refer to removing certain data from a data structure, causing the data to also produce an anomalous output when used as part of a training data set. Further, data poisoning may likewise refer to transforming certain data from a data structure, causing the data to also produce an anomalous output when used as part of a training data set. It is to be understood that data poisoning may refer to any type of data manipulation suitable causing the data to produce an anomalous output when used as part of a training data set, and may include any combination of including, removing, and transforming data in a data structure.

The terms "machine learning mode" and "ML model" refer to any machine learning based architecture.

The term "input data" refers to data selected by a user to be poisoned. Accordingly, input data may include any data that which the user desires to poison for the purpose of making said data not usable in training a ML model. The relationship between data and media, to be understood by the present disclosure, is as follows: data is the digital representation of a thing, while media is the thing itself. For example, data may refer to an audio file, while media may refer to the song that is saved in that audio file. As another example, data may refer to a collection of pixels that collectively form an image of a cat, while media may refer to the image of the cat itself.

The terms "training dataset", "training data", and "training set" may all be used interchangeably and refer to the data used to train an ML model. The data points included in the training set are used to learn the parameters of the model of interest. Further, training data may include the initial dataset used to train a machine learning algorithm, as well as data used by a model to create and refine rules based on the data. Further, a training dataset is a set of data samples used to fit the parameters of a machine learning model to training it by example. Training data is useful for building a machine learning model, as the training data teaches what the expected output looks like. The model analyzes the training dataset repeatedly to understand the data characteristics and adjust itself for better performance.

Training data can be classified into two categories: labeled data and unlabeled data. Labeled data is a group of data samples tagged with one or more meaningful labels. For example, images of animals can be tagged as cats, dogs, birds, lizards, fish, etc. Labeled training data is used in supervised learning and enables ML models to learn the characteristics associated with specific labels, which can be used to classify newer data points. In the example above, this means that a model can use labeled image data to understand the features of specific animals and use this information to group new images. In comparison, unlabeled data is not tagged with any labels for identifying classifications, characteristics, or properties. Unlabeled data is used in unsupervised machine learning, where the ML model itself finds patterns or similarities in the data to reach conclusions. In accordance with the previous example of cats, dogs, birds, lizards, fish, in unlabeled training data, the images of those animals are not labeled. The model instead evaluates each image by looking at its characteristics, such as color and shape. During supervised learning, training data may require some human involvement to analyze or process the data for machine learning use. During unsupervised learning, no human involvement may be needed to analyze or process data.

The terms "testing dataset" "testing data" and "testing set" may all be used interchangeably and refer to the data used to evaluate the performance of a model and ensure that the model is able to generalize well to new, unseen data points. The relationship between training data and testing data is as follows: training data is the data used in model training, or in other words, the data used to fit the model. In comparison, test data is used to evaluate the performance or accuracy of the model. Accordingly, testing data is a sample of data used to make an unbiased evaluation of the final model fit on the training data.

The term "connection" refers to connecting any component as defined below by any means, including but not limited to, a wired connection(s) using any type of wire or cable including but not limited to, coaxial cable(s), fiberoptic cable(s), or ethernet cable(s) or wireless connection(s) using any type of frequency/frequencies or radio wave(s). Some examples are included below in this application.

The term "invention" or "present invention" refers to an embodiment of the invention being applied for via the patent application with the title "ANTI-LEARNING FOR DIGITAL CONTENT PROTECTION AND RIGHTS MANAGEMENT". Invention may be used interchangeably with "DunceHat."

The invention expressly should not be limited to such example embodiments illustrating some possible non-limiting combination of features that may exist alone or in other combinations of features; the scope of the claimed invention being defined by the claims appended hereto.

This disclosure describes the best mode or modes of practicing the invention as presently contemplated. This description is not intended to be understood in a limiting sense but provides an example of the invention presented solely for illustrative purposes by reference to the accompanying drawings to advise one of ordinary skill in the art of the advantages and construction of the invention. In the various views of the drawings, like reference characters designate like or similar parts.

An embodiment of the present disclosure includes a method for intentional data poisoning. Some such embodiments of the present disclosure enable a user to secure data from being used without authorization and prevents the risk that data will be used as part of an ML training data set.

In the present digital age, it is becoming increasingly easier to recreate the style of likeness of a particular creator's work. Further, it may become increasingly difficult to be able to distinguish between an authentic creative work and a reproduction of a creative work. The example embodiments disclosed herein effectively establish authenticity of a particular creative work, by ensuring that the data of a digital media through a method of digital watermarking. In some embodiments disclosed herein, every time a file is accessed and decrypted, a record is made and kept within the data structure of who, when, and where the poisoned data was un-poisoned. Further, in one embodiment, only the original user has access to the original work that has never been altered. By poisoning a digital creative work prior to sharing it, the authenticity of the original digital creative work as well a record maintaining the authenticity for the original digital creative work is established.

One objective of the present invention is to secure data. Another objective of the present invention is to thwart training of a machine learning model that is being trained on data that has been obtained improperly and/or without authorization. Another objective of the present invention is to prevent the unauthorized and unintended consumption of networking or other computer resources by automated scripts, programs, and bots for collecting training data.

Another objective is to protect the value of a specific style or likeness as intellectual property. Further, another objective is to establish authenticity of an original creative work, thereby adding value through authenticity to the original creative work. Another objective is to prevent the creation of ‘deep fakes’, forgeries, or misrepresentation through further data manipulation. In this scenario, the data is not imitated but used in part to train altering another piece of media or data set.

Another objective of an embodiment of the present disclosure includes creation of a system for digital content rights management. Another objective of an embodiment of the present disclosure includes creation of a secure intellectual property licensing platform.

Another object of an embodiment of the present disclosure includes providing watermarking for digital content. A digital watermark is a kind of marker covertly embedded in a noise-tolerant signal such as, for example, audio, video or image data. A watermark is typically used to identify ownership of the copyright of such a signal. Accordingly, watermarking generally includes hiding digital information in a carrier signal. In some embodiments, the hidden information is related to the carrier signal. In some other embodiments, the hidden information is not related to the carrier signal. Digital watermarks may be used to verify the authenticity or integrity of the carrier signal or to show the identity of its owners. In accordance with the present disclosure, the present invention includes a method of digital watermarking wherein the digital watermark is not visible to a human observer, but nonetheless deters unauthorized usage of data and simultaneously shows ownership of the data.

Another object of an embodiment of the present disclosure includes prevention of unauthorized and unintended consumption of networking or other computer resources by automated scripts, programs, and bots for collecting training data. For example, a stock photo site may have a policy against “scraping thumbnails” for ML training but the dominant enforcement currently may be to look for spikes in consumption. Unauthorized scrapers that go slow enough to be undetected still could collectively consume major resource against the site’s paying customer trying to find the appropriate stock photo and harming the intending business interaction that the thumbnails were being made available to enhance. Applying DunceHat technology to the thumbnails would eventually take away the value of them in ML training and less likely to use the site as a scraping resource.

Another object of an embodiment of the present disclosure is to increase ethical consideration of image use. Accordingly, an embodiment enables a user to share images on social media or on the internet in general for viewing without the worry of such images becoming available for training. Currently, some of the largest data aggregators and miners are also some of the largest electronic/computer communication platforms. While a copyright or watermark can exist to somewhat deter copying that can go unnoticed or even if the platform is claiming usage of the content (image, audio, video, extended new media, etc.) its origin is noticeable. Currently, there does not exist an analog in the case of training neural networks. Creators are faced with a dilemma of not being able to communicate creative content or having their creative content used against the creator’s wishes in training a network. A creator may have stipulations such as not using an image in connection with sale of alcohol or tobacco. However, a simple notice to not use said creative content for ML training is not effective as the result is a data representation that is not easily observable by a human without an interface that in itself dictates the scope of what is presented. Depending what the network is being trained on and how the network was trained, it may not be obvious what data was used. Embedded code in the poisoned data may alert the original owner anytime the poison data is accessed and/or un-poisoned. In some embodiments, code may be embedded into any one of at least input data, poisoned data, a delta between an input dataset and an original input dataset, an encrypted delta between an input dataset and an original input dataset, a license-key, and/or a recorded event related as described herein.

In a particular embodiment, the DunceHat technology may comprise a machine learning network designed with the purpose of optimizing the introduction of ‘bad’ data or noise (perturbation), in order to produce the worst results (incorrect predictions or inference) for the ML models (e.g., a data clustering, classifiers, and regressors, etc.) while maintaining a balance with least human perceivable change to the media content. The present invention may include other neural network architectures as they come to use, and the specific architecture is not a limiting aspect of the present invention.

Further, the present disclosure describes the use of a Generative Adversarial Network (“GAN”) only as one exemplary way to accomplish the production of optimally poisoned data. Accordingly, GANs generally comprise two neural networks: a generator and a discriminator. The generator may be a convolutional neural network (“CNN”). The discriminator may be a CNN specifically designed as a deconvolutional neural network. The goal of the generator is to artificially manufacture outputs that could easily be mistaken for real data. Accordingly, a GAN is a model in which two neural networks may compete with each other to become more accurate in their predictions. GANs typically run unsupervised and use a cooperative zero-sum game framework to learn, where one agent’s gain is another agent’s loss. Accordingly, GANs are a model architecture for training a generative model, and it in general, deep learning models may be used in this architecture.

In accordance with the present disclosure, the output produced by DunceHat may be an optimally poisoned image, including an image that may be incorrectly classified by an ML model. In addition, the output produced by DunceHat may include a key necessary to un-poison the poisoned data. In accordance with the present disclosure, a model employing multiple neural networks trained on images may generate poisoned images that look authentic and unaltered to human observers, while being incorrectly classified by a different ML model. While the use of a GAN is described in the present disclosure, it is contemplated that other presently known or unknown models comprising any number of any types of presently known or unknown neural networks may be employed to accomplish the present invention. The present invention is to be understood as not limited by the specific architecture that is employed to produce optimally poisoned data.

Although, for the sake of simplicity, a 2D image is described as an example herein, it is understood that the same principle can be extended to other types of media such as audio or video. When used for thwarting clustering and classification, the intentionally altered images that contain the optimal perturbed data to cause dataset outliers or failures, known as “adversarial” examples, or in the case of an image, adversarial images.

The perturbation may be optimized for worst results when used for training, thereby causing invalid or incorrect prediction, inference, and/or classification. When performing clustering or classification this would produce “outliers” in the produced encoding likely to be weighted lightly or completely discarded in the training process. These adversarial examples are more commonly known today as “attack vectors.” The same reasons that make adversarial examples hard to defeat as an attack vector, also makes adversarial examples a great candidate for watermarking, rights managements, secure key, and/or licensing technology, by effectively leveraging the introduced perturbation in new and useful ways.

The present disclosure includes at least one technique of intentionally poisoning data that would otherwise be used for unauthorized training an ML model. It is contemplated that at least one supervised learning technique, unsupervised learning technique, or any combination of supervised and/or unsupervised learning techniques may be employed to accomplish the inventive aspect of producing optimally poisoned data.

In some embodiments, each input data is uniquely poisoned with a unique poisoning technique. For example, the specific noise or perturbation introduced into the input data may be entirely unique each time. In some other embodiments, each input data is poisoned by using the same poisoning technique.

In some embodiments, intentionally poisoning data for the purpose of anti-learning by machine learning models includes the use of at least one intentional poisoning technique. Accordingly, the aim of at least one poisoning technique is to prevent the desired data to be poisoned from being used to train a machine learning model.

It is an inventive aspect of the at least one poisoning technique to train a machine learning model to improperly classify objects and/or relationships in data. As an overly simplified example, when a user poisons their image of a cat, the machine learning model may improperly classify the image as an image of a dog. Further, poisoning data in such a way that would intentionally cause an ML model to incorrectly classify the data, would effectively cause the ML model to be less effective. Accordingly, for an ML model to be effective, the ML model must be able to reliably predict what the data represents. To continue the previous example, if a ML model is trained to predict (with confidence) that an image of a cat is an image of a dog, then the ML model becomes essentially useless as it can no longer make accurate predictions, despite confidently classifying patterns in data incorrectly.

In ML model training, prediction and inference may refer to distinct concepts. Accordingly, prediction is the process of using a model to make a prediction about something that is yet to happen, whereas inference is the process of evaluating the relationship between the predictor and response variables. Further, inference includes using a model to learn about the data generation process, while prediction includes using a model to predict the outcomes for new data points. It is to be understood by the present disclosure that the technique of poisoning data described herein may be effective in both interfere with prediction process, as well as with inference process, of ML models.

Further, the greater likelihood that data in the wild may lead to poisoning a ML model to the point that the ML model creates faulty predictions, inferences, and/or classifications, the less data miners and scrapers will be willing to add and use unauthorized data in training data sets for use in machine learning. Accordingly, the technology disclosed in the present disclosure will encourage a paradigm shift in the way in which data miners acquire data for data sets to be used for training ML models. Data miners will become wearier of scraping images from the internet without the knowledge, consent and/or proper authorization of the artists who create them.

An example embodiment of a process disclosed herein receives a first original dataset. The embodiment modifies the first original dataset to create a first poisoned dataset. The embodiment obtains a delta between the first original dataset and the first poisoned dataset. The embodiment encrypts the delta to create an encrypted delta and creates a corresponding encryption key. The embodiment decrypts, using the encryption key, the encrypted delta to create a decrypted delta. The embodiment reverts, using the decrypted delta, the first poisoned dataset into the first original dataset.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

With reference to FIG. 1, this figure depicts a block diagram of a programmable processing system utilized as the various computing components described herein used to implement an embodiment of the present invention. The central processing unit (“CPU”) 202 is coupled to the system bus 204. The CPU 202 may be a general-purpose CPU or microprocessor, graphics processing unit (“GPU”), and/or microcontroller. The present embodiments are not restricted by the architecture of the CPU 202 so long as the CPU 202, whether directly or indirectly, supports the operations as described herein. The CPU 202 may execute the various logical instructions according to the present embodiments.

The computer system 200 also may include random access memory (RAM) 208, which may be synchronous RAM (SRAM), dynamic RAM (DRAM), synchronous dynamic RAM (SDRAM), or the like. The computer system 200 may utilize RAM 208 to store the various data structures used by a software application. The computer system 200 may also include read only memory (ROM) 206 which may be PROM, EPROM, EEPROM, optical storage, or the like. The ROM may store configuration information for booting the computer system 200. The RAM 208 and the ROM 206 hold user and system data, and both the RAM 208 and the ROM 206 may be randomly accessed.

The computer system 200 may also include an input/output (I/O) adapter 210, a communications adapter 214, a user interface adapter 216, and a display adapter 222. The I/O adapter 210 and/or the user interface adapter 216 may, in certain embodiments, enable a user to interact with the computer system 200. In a further embodiment, the display adapter 222 may display a graphical user interface (GUI) associated with a software or web-based application on a display device 224, such as a monitor or touch screen.

The I/O adapter 210 may couple one or more storage devices 212, such as one or more of a hard drive, a solid-state storage device, a flash drive, a compact disc (CD) drive, a floppy disk drive, and a tape drive, to the computer system 200. According to one embodiment, the data storage 212 may be a separate server coupled to the computer system 200 through a network connection to the I/O adapter 210. The communications adapter 214 may be adapted to couple the computer system 200 to the network 208, which may be one or more of a LAN, WAN, and/or the Internet. Further, network 208 may also include a blockchain computer network. The communications adapter 214 may also be adapted to couple the computer system 200 to other networks such as a global positioning system (GPS) or a Bluetooth network. The user interface adapter 216 couples user input devices, such as a keyboard 220, a pointing device 218, and/or a touch screen (not shown) to the computer system 200. The keyboard 220 may be an on-screen keyboard displayed on a touch panel. Additional devices (not shown) such as a camera, microphone, video camera, accelerometer, compass, and or gyroscope may be coupled to the user interface adapter 216. The display adapter 222 may be driven by the CPU 202 to control the display on the display device 224. Any of the devices 202-222 may be physical and/or logical.

Figure 3:
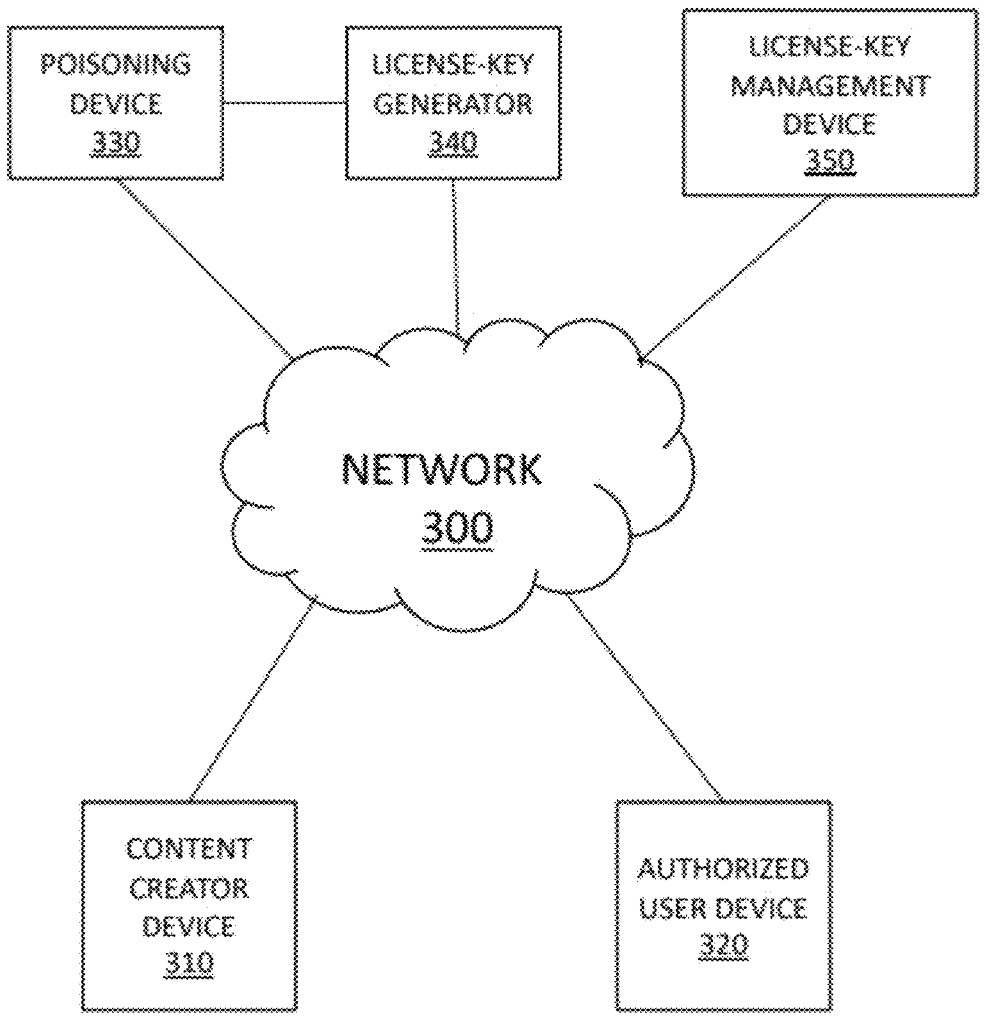
FIG. 3 is a block diagram of an example computer architecture for digital content protection and rights management.

The applications of the present disclosure are not limited to the architecture of a computer system 200. Rather the computer system 200 is provided as an example of one type of computing device that may be adapted to perform the functions of a multi-point-of-view video chat system, including servers, personal computers, and mobile devices as shown in FIG. 3. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system 200 may be virtualized for access by multiple users and/or applications.

Additionally, the embodiments described herein are implemented as logical operations performed by a computer. The logical operations of these various embodiments of the present invention are implemented (1) as a sequence of computer implemented steps or program modules running on a computing system and/or (2) as interconnected machine modules or hardware logic within the computing system. The implementation is a matter of choice dependent on the performance requirements of the computing system implementing the invention. Accordingly, the logical operations making up the embodiments of the invention described herein can be variously referred to as operations, steps, or modules.

Figure 2:
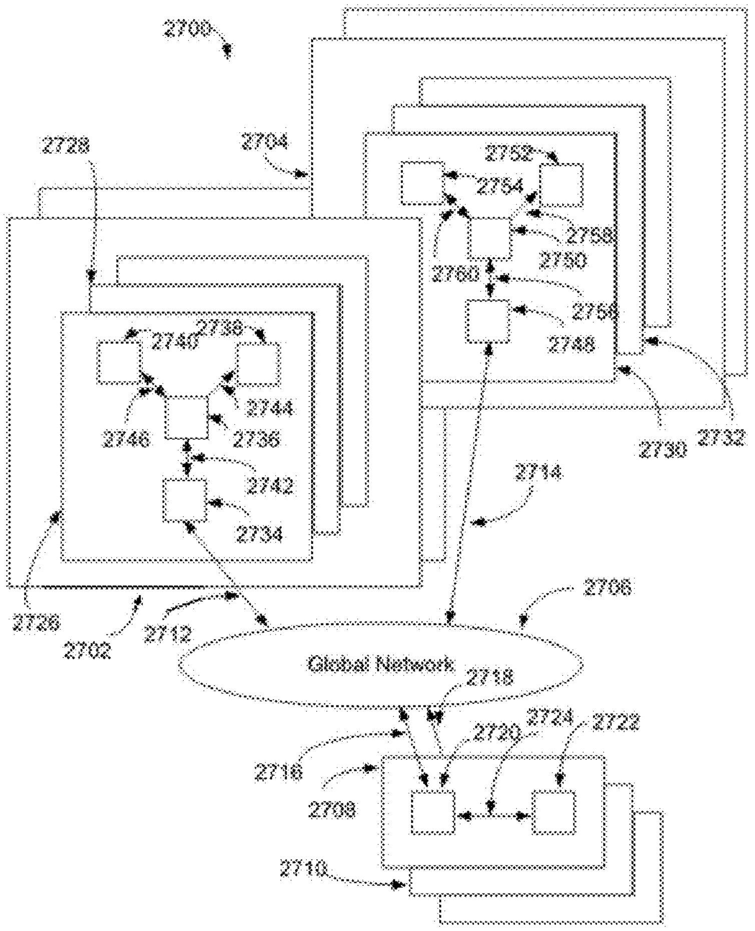
FIG. 2 is a block diagram of an example client/server system which may be used by an example web-enabled/networked embodiment of the present invention.

With reference to FIG. 2, this figure depicts a block diagram of an example client/server system which may be used by an example web-enabled/networked embodiment of the present invention. A communication system 2700 includes a multiplicity of clients with a sampling of clients denoted as a client 2702 and a client 2704, a multiplicity of local networks with a sampling of networks denoted as a local network 2706 and a local network 2708, a global network 2710 and a multiplicity of servers with a sampling of servers denoted as a server 2712 and a server 2714.

Client 2702 may communicate bi-directionally with local network 2706 via a communication channel 2716. Client 2704 may communicate bi-directionally with local network 2708 via a communication channel 2718. Local network 2706 may communicate bi-directionally with global network 2710 via a communication channel 2720. Local network 2708 may communicate bi-directionally with global network 2710 via a communication channel 2722. Global network 2710 may communicate bi-directionally with server 2712 and server 2714 via a communication channel 2724. Server 2712 and server 2714 may communicate bi-directionally with each other via communication channel 2724. Furthermore, clients 2702, 2704, local networks 2706, 2708, global network 2710 and servers 2712, 2714 may each communicate bi-directionally with each other.

In one embodiment, global network 2710 may operate as the Internet. It will be understood by those skilled in the art that communication system 2700 may take many different forms. Non-limiting examples of forms for communication system 2700 include local area networks (LANs), wide area networks (WANs), wired telephone networks, wireless networks, or any other network supporting data communication between respective entities.

Clients 2702 and 2704 may take many different forms. Non-limiting examples of clients 2702 and 2704 include personal computers, personal digital assistants (PDAs), cellular phones and smartphones.

Client 2702 includes a CPU 2726, a pointing device 2728, a keyboard 2730, a microphone 2732, a printer 2734, a memory 2736, a mass memory storage 2738, a GUI 2740, a video camera 2742, an input/output interface 2744 and a network interface 2746.

CPU 2726, pointing device 2728, keyboard 2730, microphone 2732, printer 2734, memory 2736, mass memory storage 2738, GUI 2740, video camera 2742, input/output interface 2744 and network interface 2746 may communicate in a unidirectional manner or a bi-directional manner with each other via a communication channel 2748. Communication channel 2748 may be configured as a single communication channel or a multiplicity of communication channels.

CPU 2726 may be comprised of a single processor or multiple processors. CPU 2726 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general purpose microprocessors.

As is well known in the art, memory 2736 is used typically to transfer data and instructions to CPU 2726 in a bi-directional manner. Memory 2736, as discussed previously, may include any suitable computer-readable media, intended for data storage, such as those described above excluding any wired or wireless transmissions unless specifically noted. Mass memory storage 2738 may also be coupled bi-directionally to CPU 2726 and provides additional data storage capacity and may include any of the computer-readable media described above. Mass memory storage 2738 may be used to store programs, data and the like and is typically a secondary storage medium such as a hard disk. It will be appreciated that the information retained within mass memory storage 2738, may, in appropriate cases, be incorporated in standard fashion as part of memory 2736 as virtual memory.

CPU 2726 may be coupled to GUI 2740. GUI 2740 enables a user to view the operation of computer operating system and software. CPU 2726 may be coupled to pointing device 2728. Non-limiting examples of pointing device 2728 include computer mouse, trackball and touchpad. Pointing device 2728 enables a user with the capability to maneuver a computer cursor about the viewing area of GUI 2740 and select areas or features in the viewing area of GUI 2740. CPU 2726 may be coupled to keyboard 2730. Keyboard 2730 enables a user with the capability to input alphanumeric textual information to CPU 2726. CPU 2726 may be coupled to microphone 2732. Microphone 2732 enables audio produced by a user to be recorded, processed and communicated by CPU 2726. CPU 2726 may be connected to printer 2734. Printer 2734 enables a user with the capability to print information to a sheet of paper. CPU 2726 may be connected to video camera 2742. Video camera 2742 enables video produced or captured by user to be recorded, processed and communicated by CPU 2726.

CPU 2726 may also be coupled to input/output interface 2744 that connects to one or more input/output devices such as such as CD-ROM, video monitors, track balls, mice, keyboards, microphones, touch-sensitive displays, transducer card readers, magnetic or paper tape readers, tablets, styluses, voice or handwriting recognizers, or other well-known input devices such as, of course, other computers.

Finally, CPU 2726 optionally may be coupled to network interface 2746 which enables communication with an external device such as a database or a computer or telecommunications or internet network using an external connection shown generally as communication channel 2716, which may be implemented as a hardwired or wireless communications link using suitable conventional technologies. With such a connection, CPU 2726 might receive information from the network, or might output information to a network in the course of performing the method steps described in the teachings of the present invention.

With reference to FIG. 3, this figure depicts a block diagram of an example architecture for digital content protection and rights management. Although the architecture of FIG. 3 shows a centralized license management system, it is contemplated that a decentralized distributed management system may also be employed. Content creator device 310 and authorized user device 320 may be communicatively coupled to license management device 350 via network 300. In one embodiment, license-key management device 350 is a server and is configured to provide license management for multiple users. The license-key management device 350 may store a license-key created by the license-key generator 340 that is necessary to un-poison a selected poisoned data that has been poisoned by poisoning device 330. Accordingly, the license-key management device 350 may store license-keys generated by the license-key generator 340, wherein the license-keys are necessary for reverting poisoned data back to original input data that was input by content creator device 310 to intentionally poison to prevent unauthorized use thereof.

The license management system may be used in the following exemplary manner: a content creator sends input data representing original media from their content creator device 310 to poisoning device 330 via network 300. The poisoning device 330 poisons the input data by employing an intentional data poisoning technique, thereby creating a poisoned version of the data that is unsuitable for training an ML model, while simultaneously being perceivable media by a human observer. Accordingly, the content creator user intentionally poisons data to prevent unauthorized use by third parties. When the poisoning device 330 optimally poisons input data, the license-key generator 340 produces a license-key that is used to un-poison the poisoned data. In one embodiment, the poisoned data may include embedded code that requires input of a license-key in order to un-poison the data. Further, when a third party accesses data that has been poisoned, coded instructions are executed and a license-key request may be sent to the third party who is attempting to access to the data. The license-key management device 350 may only send the license-key to an authorized user device 320 that has been authorized by content creator device 310, thus ensuring that no unauthorized third party may be able to un-poison the poisoned data.

In an embodiment, the poisoning device 330 includes a processor, a memory, and a set of instructions stored on the memory, that when executed by the processor, cause the poisoning device to perform the following example steps to optimally poison input data. In an embodiment, the poisoning device 330 trains a machine learning model to optimally poison input data. In an embodiment, optimally poisoning input data is accomplished in part by training a machine learning model to optimally poison input data to cause the output poisoned data to be unsuitable for ML training purposes while maintaining the human perceivability of the media captured by the input data. For example, the input data may include image data, and the poisoning device may poison the image data so that image captured by the original image data is still perceivable to a human observer but that may have an adversarial effect on a machine learning model if said poisoned image data is used as part of a training data set used for training a model. Although, for the sake of simplicity, a 2D image is described as an example herein, it is understood that the same principle can be extended to other types of media such as audio or video.

In an embodiment, the machine learning model trained to optimally poison input data may include elements of a GAN, such that the GAN generates image data resembling original input data that would simultaneously cause a classifier to incorrectly classify the image data with high frequency and/or confidence. While the use of a GAN is described in the present disclosure, it is contemplated that other presently known or unknown models comprising any number of any types of presently known or unknown neural networks may be employed to accomplish the present invention. For example, the machine learning model may include other elements of a different neural network architecture to generate image data that resembles original input data and also causes a classifier to incorrectly classify the image data with high frequency and/or confidence. While a classifier is described with reference to some embodiments, it is contemplated herein that the input data may be poisoned so that the input data would be incorrectly categorized, for example, by a clustering algorithm. The exact poisoning technique may be implementation specific.

In an embodiment, the machine learning model for poisoning data may be trained according to at least two criteria, including a first criterion and a second criterion. In an embodiment, the first criterion may include a misclassification rate, wherein the misclassification rate represents the likelihood that output poisoned data would be misclassified by a machine learning model. In an embodiment, the second criterion may include a perceivability rating, wherein the perceivability rating represents how perceivable the output poisoned data is compared to the original input data. In an embodiment, optimally poisoned data may include output poisoned data that corresponds to satisfactorily high misclassification rate and/or perceivability rating. In some embodiments, the satisfactorily high misclassification rate and/or perceivability may be based at least in part on one or more implementation specific thresholds, that upon meeting and/or exceeding, cause output poisoned data to be optimally poisoned data.

In some embodiments, a unique identifier in the form of metadata may be embedded in the poisoned data and/or the un-poisoned data. In some other embodiments, a unique identifier may be embedded into the un-poisoned data by a software service that un-poisons the data.

In some embodiments, the present invention includes blockchain recording of key ownership, and/or decryption events (i.e., every time a poisoned data becomes un-poisoned). The term "blockchain recording" refers to recording events in a decentralized, distributed, peer-to-peer computer network. In an embodiment, network 300 may include a blockchain computer network. In some such embodiments, the license management device 350 may be configured to record each time that poisoned data becomes un-poisoned as an event on a blockchain. In some embodiments, the license management device 350 may be configured to record each time that a license-key is transmitted as an event on a blockchain. In some embodiments, the license management device 350 may be configured to record each time that an encrypted delta is decrypted using a license-key as an event on a blockchain. In some embodiments, the license management device 350 may be configured to record each time that an license-key is requested as an event on a blockchain.

In one embodiment, the present invention is embodied as a feature of a software application. For example, a digital photography application may include the DunceHat technology as part of the application's features. To further illustrate the said example, a user may use a digital photography application to take a photograph. The image that is produced by the photography application may be automatically saved to the user's phone as a poisoned image that is indistinguishable from the original image to the naked human eye from the original but is nevertheless unsuitable for ML training purposes.

In another embodiment, the DunceHat technology may be used in conjunction with a digital audio software. For example, when a user saves a .WAV file of their audio creation, the user is actually saving a poisoned .WAV file of their audio creation that is indistinguishable to the naked human ear from the original but is nevertheless unsuitable for ML training purposes.

In another embodiment, the present invention includes a selective key management service. Accordingly, the selective key management service allows the user who inputs the original input data to be poisoned to decide who has the authorization and for what specific purpose their data may be used for. For example, the user may choose to only license the key to un-poison the poisoned data to third parties for educational purposes only, restricting those third parties from using the data in connection with any commercial purposes. As another example, the user may choose to license the key to third parties but with a licensing agreement prohibiting said third parties from using the data in connection with the sale of alcohol or tobacco. It is contemplated that the user may use the selective key management service to set any desired terms of use for the licensing of their data. In the event the data is used by a third party for an unauthorized purpose, the user will have a digital record of who the data was licensed to verify a breach of the licensing agreement.

In another embodiment, metadata may be inserted into the key to enable a user to know who used the key to revert poisoned data to original non-poisoned data. If a third-party uses the data for any purpose, whether authorized or unauthorized by the licensing agreement, there will be a record of who used the key.

In some embodiments, the present invention may be provided via a plug-in, addon, extension, API, or other interface. Further, in some such embodiments, the present invention may be provided as a feature of a parent software application.

In another embodiment, the present invention may be used in conjunction with a digital and/or analog plug-in configured to poison music as it is performed live or digitally streamed.

In another embodiment, the present invention may be used to poison live streaming video. In one embodiment, the video is first sent from a user computer to a server system configured to poison the data before the video is broadcast to third parties. Accordingly, the present invention may be employed to poison time-based media.

Figure 4:
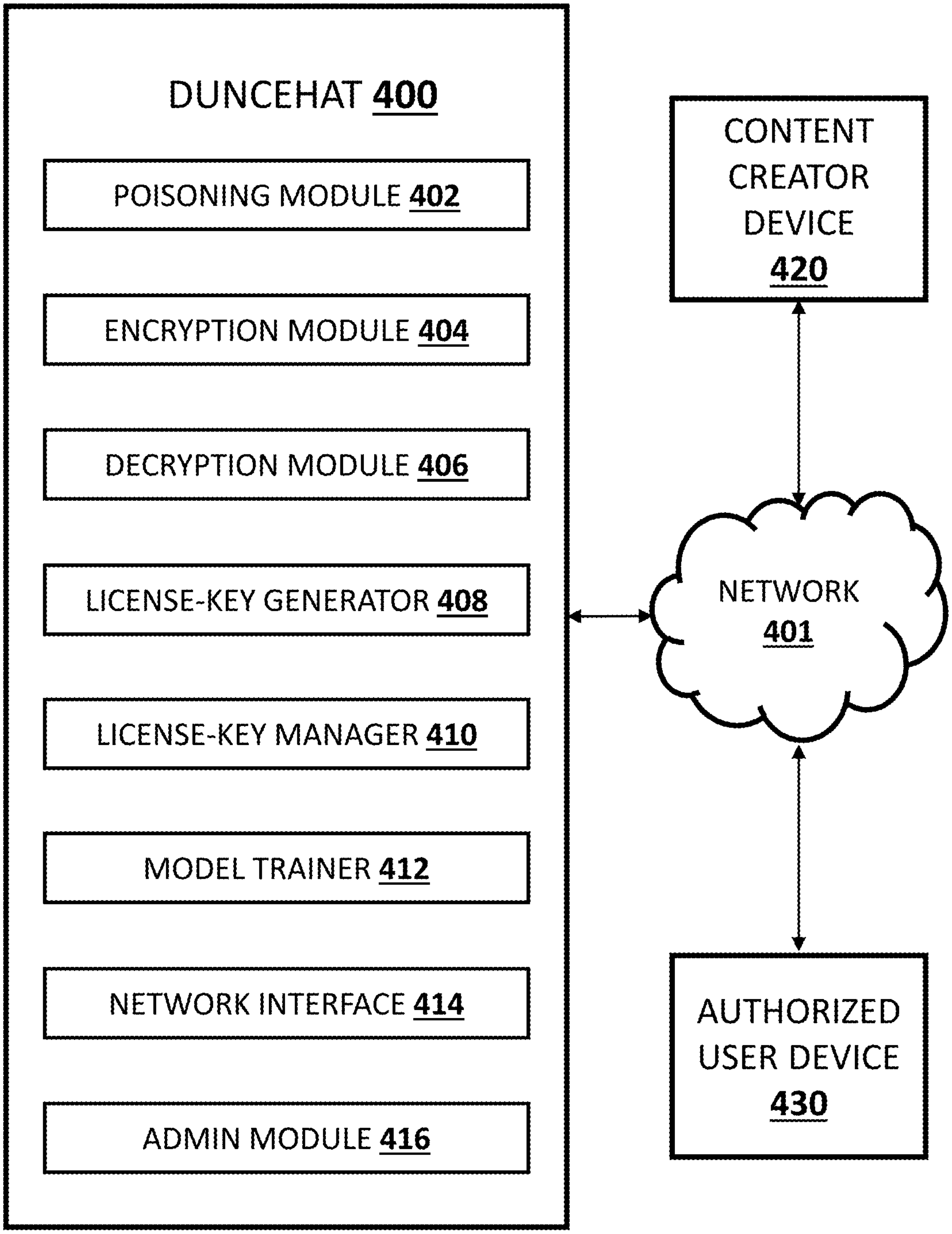
FIG. 4 is a block diagram of an example software module for digital content protection and rights management.

With reference to FIG. 4, this figure depicts a block diagram of an example software module for DunceHat anti-learning for digital content protection and rights management. The DunceHat module 400 may include a plurality of software modules. In the illustrated embodiment, the DunceHat module 400 includes a poisoning module 402, an encryption module 404, a decryption module 406, a license-key generator 408, a license-key manager 410, a model trainer 412, a network interface 414, and an administrator module 416. In alternative embodiments, the DunceHat module 400 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, the poisoning module 402 is a software module configured to poison input data. In an embodiment, poisoning input data causes the output poisoned data to become unsuitable for use in training a machine learning model, while also maintaining a resemblance to the media of the original input data. In an embodiment, the poisoning module 402 utilizes elements a GAN to generate a similar image as captured by the image data that likewise is likely to be misclassified by a machine learning model.

In the illustrated embodiment, the encryption module 404 is a software module configured to encrypt a delta between the input data and the output poisoned data. In an embodiment, the encryption module 404 obtains a delta between the original input data and the output poisoned data, and encrypts the delta using an encryption technique. An embodiment also includes generating a key to decrypt the delta, wherein decrypting the delta will allow reverting the poisoned data set back into the input data set. In an embodiment, the key to decrypt the delta is generated by a license-key generator 408 upon encrypting the delta.

In the illustrated embodiment, the license-key generator module 408 is a software module configured to generate a license-key associated with the input data, poisoned data, and/or delta between the input data and the poisoned data. In the illustrated embodiment, the license-key generator module 408 generates a key to decrypt the encrypted delta between the original input data and the output poisoned data. In an embodiment, the license-key generator module 408 generates a license-key to decrypt the encrypted delta encrypted by encryption module 404. An embodiment also includes sending the key to a user. In an embodiment, the license-key manager module 410 transmits the key to an authorized user. In an embodiment, the DunceHat module 400 acquires input data from a user, manipulates the input data, thereby creating poisoned data, obtains a delta between the poisoned data and the input data, encrypts the delta, and generates a key to decrypt the delta, wherein decrypting the delta will allow the user to revert the poisoned data back into the input data, In the illustrated embodiment, the decryption module 406 is a software module configured to decrypt the encrypted delta between the input data and the output poisoned data created by encryption module 404. In an embodiment, the license-key generated by the license-key generator 408 generates a key to decrypt the delta, wherein decrypting the delta enables reverting the poisoned data back into the input data. In an embodiment, the decryption module 406 utilizes the license-key generated by the license-key generator module 408 to decrypt an encrypted delta between original input data and poisoned data, thereby enabling the DunceHat module 400 to revert the poisoned data to the original input data. In an embodiment, the license-key may be stored on a license-key manager module 410.

In the illustrated embodiment, the license-key manager module 410 is a software module configured to manage a set of license-keys. In an embodiment, the license-key manager module 410 is configured to send the license-key to an authorized user device. In an embodiment, the license-key manager module 410 controls a server configured to provide license management for multiple users. The license-key manager module 410 may store a license-key created by the license-key generator module 408 that is necessary to un-poison a selected poisoned data that has been poisoned. Accordingly, the license-key manager module 410 may store license-keys generated by the license-key generator 408, wherein the license-keys are necessary for reverting poisoned data back to original input data that was input by content creator device 420 to intentionally poison to prevent unauthorized use thereof. In an embodiment, the license-key manager module 410 is configured to decrypt the delta upon receiving a license-key from a device. In a particular embodiment, the license-key manager module 410 is configured to revert the poisoned data to the input data using the decrypted delta. In an embodiment, poisoning and/or unpoisoning may be performed via a remote server device operated by license-key manager module 410, and poisoned and/or unpoisoned data, license-key data, etc., may be transmitted via the remote server device to one or more remote authorized user devices across an encrypted connection. In a particular embodiment, the authorized user device 430 is configured to decrypt the delta upon receiving the license-key. In a particular embodiment, the authorized user device 430 is configured to revert the poisoned data to the input data using the decrypted delta. In some embodiments, the license-key manager module 410 tracks usage of license-keys generated. In an embodiment, every time a file is accessed and decrypted, a record is made and kept within a data structure of who, when, and where the poisoned data was un-poisoned. Further, in one embodiment, only the original user has access to the original work that has never been altered. By poisoning a creative work prior to sharing it, the user preserves the authenticity of original work as well as maintains record of the authenticity for the original work. In some embodiments, the license-key management module 410 employs blockchain recording of key ownership, and/or decryption events (i.e., every time a poisoned data becomes un-poisoned). The term "blockchain recording" refers to recording events in a decentralized, distributed, peer-to-peer computer network. In an embodiment, network 401 may include a blockchain computer network. In some such embodiments, the license-key manager module 410 may be configured to record each time that poisoned data becomes un-poisoned as an event on a blockchain. In some embodiments, the license-key manager module 410 may be configured to record each time that a license-key is transmitted as an event on a blockchain. In some embodiments, the license-key manager module 410 may be configured to record each time that an encrypted delta is decrypted using a license-key as an event on a blockchain. In some embodiments, the license-key manager module 410 may be configured to record each time that a license-key is requested as an event on a blockchain.

In the illustrated embodiment, the model trainer module 412 is a software module configured to train a machine learning model to generate output data based on input data that highly resembles input data and at the same is unsuitable for machine learning purposes. In an embodiment, the model trainer module 412 trains a model employing multiple neural networks trained on images to generate poisoned images that look authentic and unaltered to human observers, while being incorrectly classified by a different ML model. While the use of a GAN is described in the present disclosure, it is contemplated that other presently known or unknown models comprising any number of any types of presently known or unknown neural networks may be employed to accomplish the present invention. The present invention is to be understood as not limited by the specific architecture that is employed to produce optimally poisoned data.

The present disclosure includes at least one technique of intentionally poisoning data that would otherwise be unauthorizedly used for training an ML model. In some embodiments, one or more machine learning (ML) algorithms is trained to alter the input data to cause the input data to be altered in such a manner that enables the media captured by the data to remain perceivable by a human observer. It is contemplated that at least one supervised learning technique, unsupervised learning technique, or any combination of supervised and/or unsupervised learning techniques may be employed to accomplish the inventive aspect of producing optimally poisoned data. The at least one poisoning technique may be utilized to cause a machine learning model to improperly classify objects and/or relationships in data. As an overly simplified example, when a user poisons their image of a cat, the machine learning model may improperly classify the image as an image of a dog. Further, poisoning data in such a way that would intentionally cause an ML model to incorrectly classify the data, would effectively cause the ML model to be less effective, since the ML model becomes essentially useless if it can no longer make accurate predictions, despite confidently classifying patterns in data incorrectly.

In an embodiment, the model trainer module 412 trains a machine learning model to generate optimal perturbation to introduce into input data to thereby poison the input data. The perturbation may be optimized for worst results when used for training, thereby causing invalid or incorrect prediction, inference, and/or classification. When performing clustering or classification this would produce "outliers" in the produced encoding likely to be weighted lightly or completely discarded in the training process. These adversarial examples make a great candidate for watermarking, rights management, secure key, and/or licensing technology, by effectively leveraging the introduced perturbation in new and useful ways.

Further, the present disclosure describes the use of a Generative Adversarial Network ("GAN") only as one exemplary way to accomplish the production of optimally poisoned data. Accordingly, GANs are a model architecture for training a generative model, and it in general, deep learning models may be used in this architecture. In an embodiment, the machine learning model trained to optimally poison input data may include elements of a GAN, such that the GAN generates image data resembling original input data that would simultaneously cause a classifier to incorrectly classify the image data with high frequency and/or confidence. While the use of a GAN is described in the present disclosure, it is contemplated that other presently known or unknown models comprising any number of any types of presently known or unknown neural networks may be employed to accomplish the present invention. For example, the machine learning model may include other elements of a different neural network architecture to generate image data that resembles original input data and also causes a classifier to incorrectly classify the image data with high frequency and/or confidence. While a classifier is described with reference to some embodiments, it is contemplated herein that the input data may be poisoned so that the input data would be incorrectly categorized, for example, by a clustering algorithm. The exact poisoning technique may be implementation specific.

In an embodiment, the machine learning model for poisoning data may be trained according to at least two criteria, including a first criterion and a second criterion. In an embodiment, the first criterion may include a misclassification rate, wherein the misclassification rate represents the likelihood that output poisoned data would be misclassified by a machine learning model. In an embodiment, the second criterion may include a perceivability rating, wherein the perceivability rating represents how perceivable the output poisoned data is compared to the original input data. In an embodiment, optimally poisoned data may include output poisoned data that corresponds to satisfactorily high misclassification rate and/or perceivability rating. In some embodiments, the satisfactorily high misclassification rate and/or perceivability may be based at least in part on one or more implementation specific thresholds, that upon meeting and/or exceeding, cause output poisoned data to be optimally poisoned data.

In the illustrated embodiment, the DunceHat module 400 may receive input data transmitted from content creator device 420 via network 401. Content creator device 420 may include any type of computing device, including but not limited to, a laptop, a smartphone, a tablet, etc. The network 401 may include elements of any network described herein. In some embodiments, the network 401 may include a local area network (LAN), a wide area network, (WAN), and/or the Internet. In some embodiments, the network 401 includes a blockchain computer network. The input data may include, for example, image data, and the DunceHat module 400 may poison the image data so that the image captured by the original image data is still perceivable to a human observer but the image data may have an adversarial effect on a machine learning model if said poisoned image data is used as part of a training data set used for training a model. Although, for the sake of simplicity, a 2D image is described as an example herein, it is understood that the same principle can be extended to other types of media such as audio or video. Upon poisoning the input data and encrypting the delta between the original input data and the output poisoned data, content creator device 420 may decrypt and revert the poisoned data using license-key generated by license-key generator module 408. In an embodiment, DunceHat module 400 may transmit a license-key generated by license-key generator module 408 to authorized user device 430, to enable authorized user device 430 to decrypt and revert the poisoned data using the license-key.

In the illustrated embodiment, the network interface module 414 is a software module configured to connect DunceHat module 400 to a network, such as network 401, which may include, for example, the Internet. Non-limiting examples of forms of other networks may include local area networks (LANs), wide area networks (WANs), wired telephone networks, wireless networks, or any other network supporting data communication between respective entities. Network interface module 414 may communicate in a unidirectional manner or a bi-directional manner with each network via a single communication channel or a multiplicity of communication channels. In the illustrated embodiment, network interface module 414 enables DunceHat module 400, content creator device 420, and authorized user device 430 to communicate and transmit data between each other via network 401.

In the illustrated embodiment, the administrator module 416 is a software module configured to enable a person having sufficient administrative privileges to perform certain tasks associated with DunceHat module 400 as described herein. For example, in some embodiments, the administrator module 416 allows an administrative user to initiate and monitor the training process performed by the model trainer module 412, including setting desired parameters and/or hyperparameters for the training process.

Figure 5:
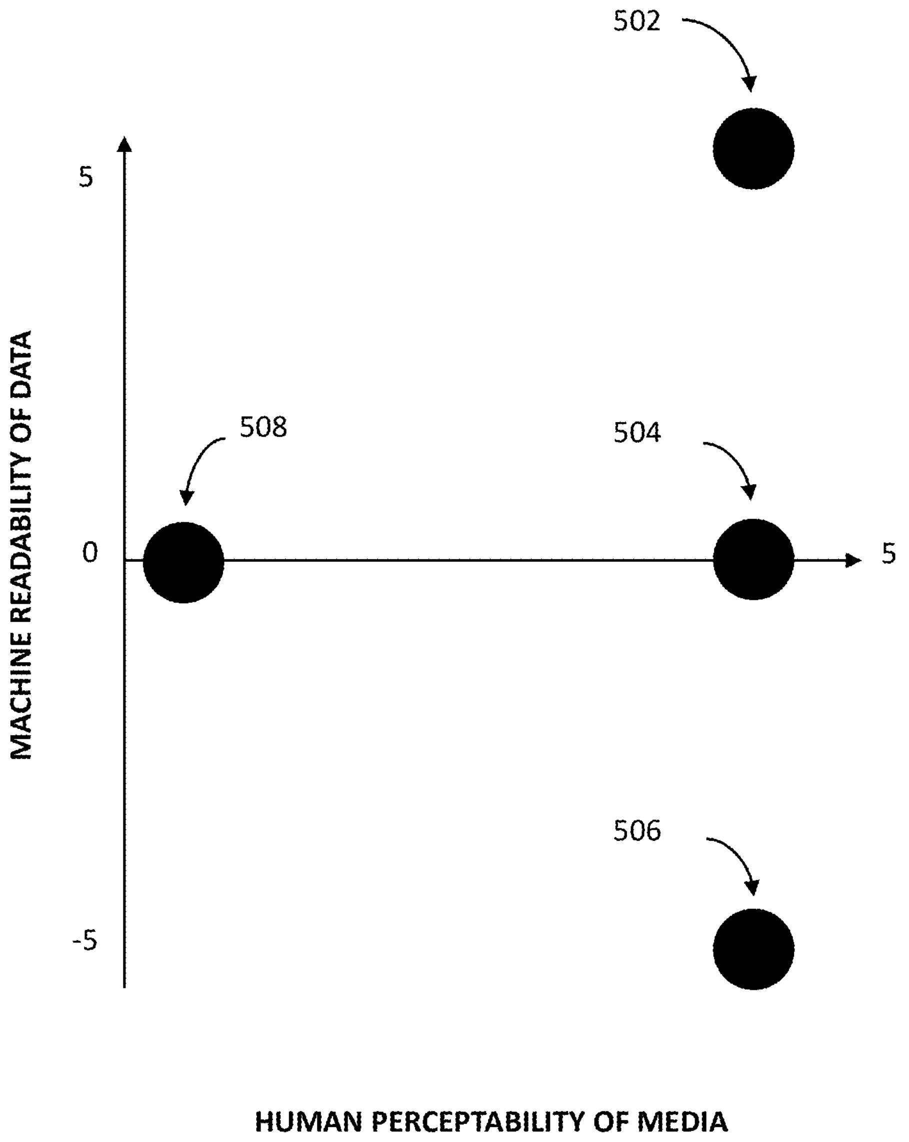
FIG. 5 is a diagram of a graph illustrating the relationship between computer readability of poisoned data and human perceptibility of the media represented by the poisoned data.

With reference to FIG. 5, this figure depicts a graph of a relationship between computer readability of data and human perceptibility media represented by said data. In the illustrated embodiment, the X-Axis of graph 500 corresponds to human perceptibility of media, whereas the Y-Axis of graph 500 corresponds to machine readability of data. Accordingly, one aim of the present invention is to produce poisoned data that maximizes the likelihood of incorrect classification, while simultaneously maintaining a least observable distortion to the media perceived by a user.

It is understood that graph 500 includes values for the purposes of better visualizing optimally poisoned data. Point 502 represents an input data that has not been poisoned optimally. Accordingly, data represented by point 502 is both highly readable by a computer, and the media represented by the data is likewise highly perceivable as unaltered by a human observer. In contrast to point 502, point 504 is a better poisoned data. Accordingly, point 504 shows that the data is not accurately readable by a computer, yet the media that the data represents is still accurately perceivable by a human observer. Point 506 represents more optimally poisoned data. Accordingly, point 506 shows that the data is even less accurately readable by a computer than point 504. Whereas point 504 shows data that a computer may have difficulty reading and/or classifying, point 506 is optimally poisoned in a manner such that a computer would confidently classify the data as something that the data does not represent. Further accordingly, point 406 shows that the data may be very inaccurately read by a computer, while the media represented by the said data is still very perceivable by a human observer as being unaltered. Point 508 shows data that has been poisoned in another non-optimal way, in so that the data is not readable by a computer, though the media represented by the data is not accurately perceivable by a human observer either. Accordingly, it is an aim of the present invention to allow users to safely share media without the possibility that said media being read by a computer to train a machine learning model, and for that shared media to still be accurately perceivable by an observer with minimal or no perceivable alteration to the original media as it was intended to be perceived.

In some embodiments, one or more machine learning (ML) algorithms is trained to alter the input data to cause the input data to be altered in such a manner that causes the input data to negatively affect performance and/or training of an ML model, such as for example, causing an ML to confidently improperly classify the data that is obtained without authorization. In some embodiments, one or more machine learning (ML) algorithms are trained to alter the input data to cause the input data to be altered in such a manner that enables the media captured by the data to remain perceivable by a human observer. In an embodiment, the ML model for generating optimally poisoned data may be trained according to at least two criteria. A first criterion may include machine readability of data. A second criterion may include human perceptibility of media. In an embodiment, the optimally poisoned data comprises data that meets at least one of a machine readability threshold and a human perceptibility threshold. In an embodiment, the machine readability threshold corresponds to a threshold value associated with machine readability of data that when met causes the machine readability of the data to be considered sufficiently low. In an embodiment, the human perceptibility threshold corresponds to a threshold value of human perceptibility of media that when met causes the human perceptibility of the media to be considered sufficiently high. In an embodiment, optimally poisoned data may be based on a combination of implementation specific desired machine readability of data and human perceptibility of media.

Figure 6:
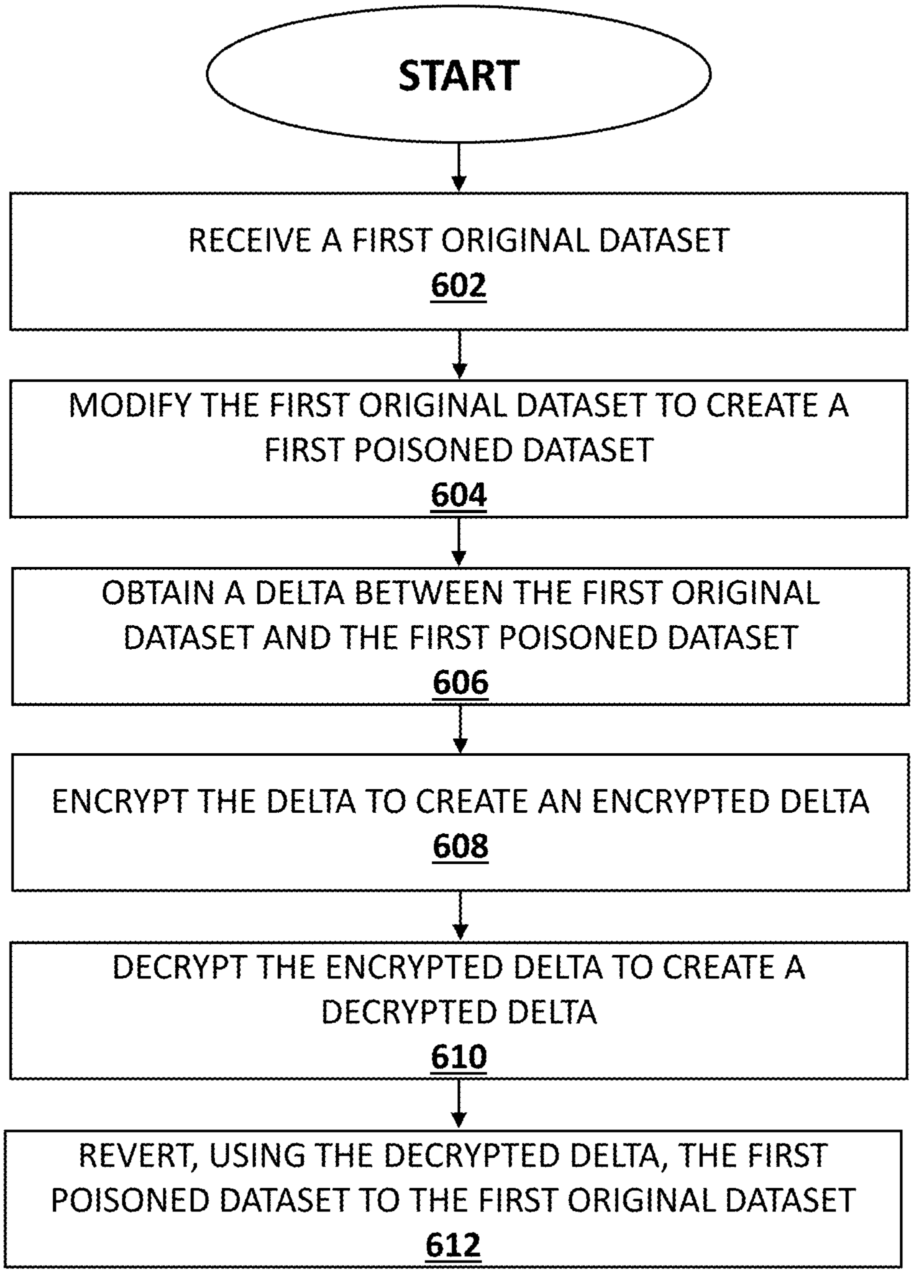
FIG. 6 is a flowchart illustrating an example method of intentional data poisoning for anti-learning.

With reference to FIG. 6, this figure depicts a flowchart illustrating an example process of intentional data poisoning for anti-learning. Steps of process 600 may be executed using an implementation specific combination of computing elements described herein.

With continued reference to FIG. 6, at step 602 the process receives a first original dataset. At step 604, the process modifies the first original dataset to create a first poisoned dataset. In an embodiment, the process modifies the first original dataset to create a poisoned version of the data that is unsuitable for training an ML model. Furthermore, the media captured by the first poisoned dataset may be perceived as being similar to or the same as the original media captured by the first input dataset.

At step 606, the process obtains a delta between the first original dataset and the first poisoned dataset. At step 608, the process encrypts the delta to create an encrypted delta. In an embodiment, the process may further include generating a license-key to decrypt the encrypted delta. At step 610, the process decrypts the encrypted delta to create a decrypted delta. In an embodiment, the process includes receiving the license-key generated for the encrypted delta and upon entering the license-key, decrypting the encrypted delta to create a decrypted delta. At step 612, the process reverts, using the decrypted delta, the first poisoned dataset to the first original dataset.

Figure 7:
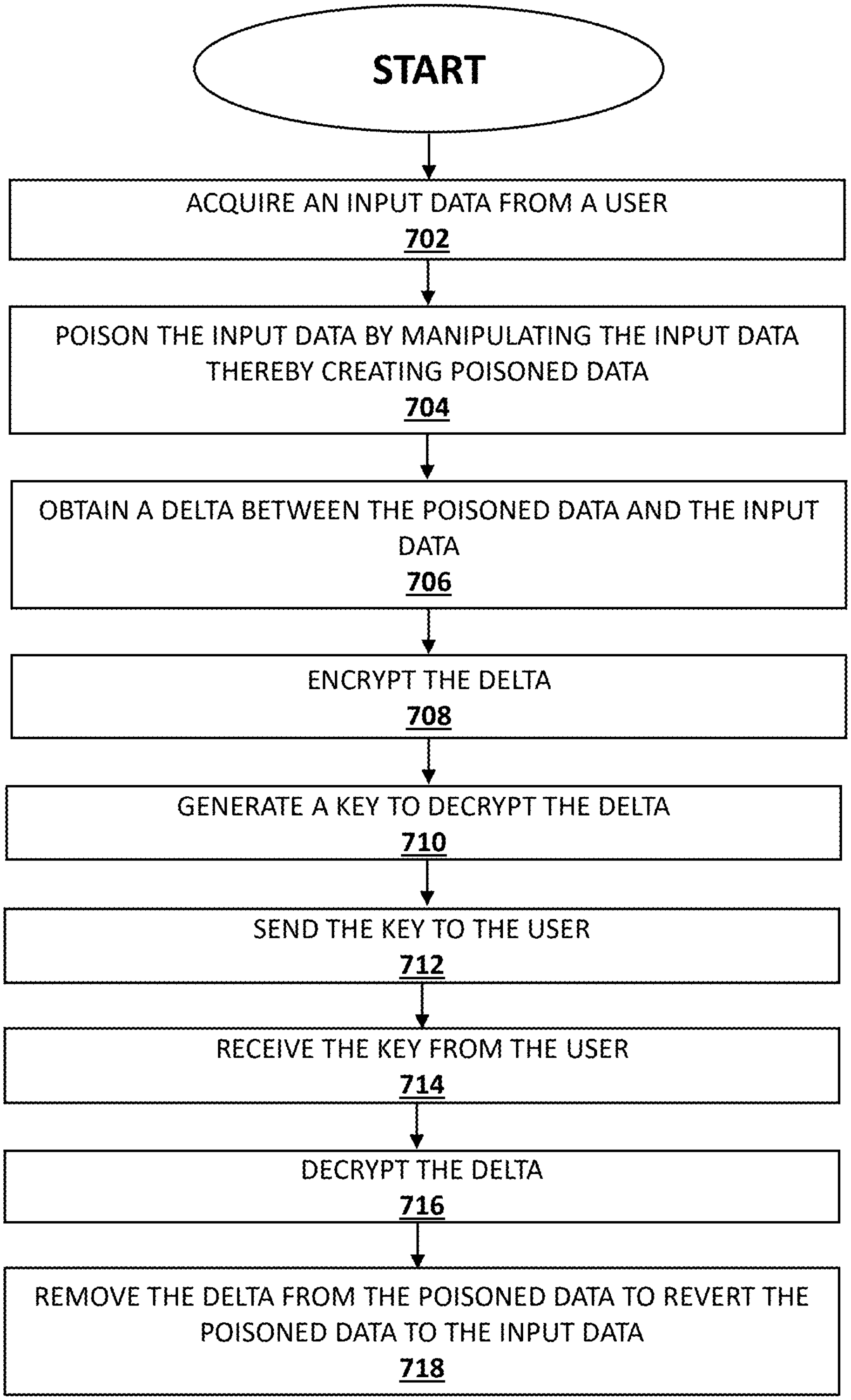
FIG. 7 is a flowchart illustrating an example method of intentional data poisoning for anti-learning.

With reference to FIG. 7, this figure depicts a flowchart illustrating an example method of intentional data poisoning for anti-learning. Steps of method 700 may be executed using an implementation specific combination of computing elements described herein. The method 700 generally comprises the following steps: acquiring an input data from a user, manipulating the input data, thereby creating poisoned data, obtaining a delta between the poisoned data and the input data, encrypting the delta, generating a key to decrypt the delta, wherein decrypting the delta will allow the user to revert the poisoned data back into the input data, sending the key to the user, receiving the key from the user, decrypting the delta, and removing the delta from the poisoned data to revert the poisoned data to the input data.

With continued reference to FIG. 7, at step 702, an input data is acquired from a user device. It is to be understood that any type of data may be used, including but not limited to, an image, a video, an audio file, or any other type of data. Further, the data may be any type of file format, including but not limited to, a .JPEG, a .PNG, a .GIF, a .PDF, an .SVG, an .MP4, a .WAV, or any other type of file.

At step 704, the input data is intentionally poisoned. Accordingly, optimal perturbation (or "noise") is used to alter the input data. It is to be understood that there exist a multitude of different ways that the input data may be intentionally poisoned, and the example method described in the present disclosure is not a limiting aspect of the present invention. Further, at step 704, it is contemplated that the type of perturbation introduced may be imperceptible to a human observer, while at the same time alters the data in such a way that makes the data not usable for machine learning purposes. Accordingly, the input data may be poisoned by manipulating the input data, wherein manipulating the input data may be accomplished by introducing data, removing data, transforming data, altering data, and/or any combination thereof.

At step 706, a delta is obtained between the poisoned data and the original input data. The delta is effectively the difference between the poisoned data and the original input data. A user may analyze the delta in order to ascertain the differences between the input data and the poisoned data. For example, if the delta were known, the additional data that was introduced, into the input data would likewise be known, thus allowing a user to remove the additional data from the input data to effectively revert the poisoned data to the original input data. Likewise, knowledge of the delta would allow an unauthorized user to ascertain how the original input data was manipulated and/or altered with noise.

At step 708, the delta is encrypted. It is contemplated that the delta may be encrypted using any encryption technique, without departing from the spirit and scope of the present invention. At step 710, a key is generated to be used to decrypt the delta. In some embodiments, there is no key generated to decrypt the delta, thus preventing the now poisoned input data from ever being used to train in a machine learning model.

At step 712, the key is sent to the user. It is contemplated that the unique key may be subsequently licensed to a third-party, thereby authorizing the use of the original input data by the third-party licensee for whatever specific purposes the licensor authorizes the input data to be used for. For example, it may be the case that the licensor may license the key to the licensee under the condition that the original input data is not used to train a ML model to copy or imitate the likeness of the original input data.

At step 714, the key is received from the user. It is contemplated that the key may be received by the original user or a third-party licensee for the purposes of removing the poison from the poisoned data, and/or reverting the poisoned data into the original input data. Next, at step 716, the delta is decrypted. At step 718, the delta is removed from the poisoned data to revert the poisoned data back into the original input data that was input by the user.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention. This written description provides an illustrative explanation and/or account of the present invention. It may be possible to deliver equivalent benefits using variations of the specific embodiments, without departing from the inventive concept. This description and these drawings, therefore, are to be regarded as illustrative and not restrictive

What is claimed is:

1. A computer-implemented method, the method comprising the steps of:
receiving a first original dataset;
modifying the first original dataset to create a first poisoned dataset;
obtaining a delta between the first original dataset and the first poisoned dataset;
encrypting the delta to create an encrypted delta and creating a corresponding encryption key;
decrypting, using the encryption key, the encrypted delta to create a decrypted delta; and
reverting, using the decrypted delta, the first poisoned dataset into the first original dataset.

2. The computer-implemented method of claim 1, wherein the computer-implemented method further comprises:
training a machine learning model to optimally poison data; and
wherein the modifying the first original dataset to create a first poisoned dataset comprises inputting the first original dataset into the machine learning model to output the first poisoned dataset.

3. The computer-implemented method of claim 2, wherein training the machine learning model further comprises training the machine learning model according to a machine readability of data criterion.

4. The computer-implemented method of claim 2, wherein training the machine learning model further comprises training the machine learning model according to a human perceptibility of media criterion.

5. The computer-implemented method of claim 1, wherein the computer-implemented method further comprises generating a license-key corresponding to the encrypted delta.

6. The computer-implemented method of claim 5, wherein the computer-implemented method further comprises:
transmitting, using a license-key manager, the license-key to an authorized user device;
transmitting, using the authorized user device, the license-key to the license-key manager;
upon receiving the license-key from the authorized user device, decrypting, using the license-key manager, the encrypted delta to create a decrypted delta;
reverting, using the license-key manager, the first poisoned dataset into a first unpoisoned dataset; and
transmitting, using the license-key manager, the first unpoisoned dataset to the authorized user device.

7. The computer-implemented method of claim 1, wherein the computer-implemented method further comprises recording every instance of decrypting the encrypted delta.

8. A computer program product comprising one or more non-transitory computer readable storage media, and program instructions collectively stored on the one or more non-transitory computer readable storage media, the program instructions executable by a processor to cause the processor to perform operations comprising:
receiving a first original dataset;
modifying the first original dataset to create a first poisoned dataset;
obtaining a delta between the first original dataset and the first poisoned dataset;
encrypting the delta to create an encrypted delta and a corresponding encryption key;
decrypting, using the encryption key, the encrypted delta to create a decrypted delta; and
reverting, using the decrypted dela, the first poisoned dataset into the first original dataset.

9. The computer program product of claim 8, wherein the program instructions further include program instructions to cause the process to perform operations comprising:
training a machine learning model to optimally poison data; and
wherein the modifying the first original dataset to create the first poisoned dataset comprises inputting the first original dataset into the machine learning model to output the first poisoned dataset.

10. The computer program product of claim 9, wherein training the machine learning model further comprises training the machine learning model according to a machine readability of data criterion.

11. The computer program product of claim 9, wherein training the machine learning model further comprises training the machine learning model according to a human perceptibility of media criterion.

12. The computer program product of claim 8, wherein the program instructions further include program instructions to cause the process to perform operations comprising:
generating a license-key corresponding to the encrypted delta.

13. The computer program product of claim 12, wherein the program instructions further include program instructions to cause the process to perform operations comprising:
transmitting, using a license-key manager, the license-key to an authorized user device;
transmitting, using the authorized user device, the license-key to the license-key manager;
upon receiving the license-key from the authorized user device, decrypting, using the license-key manager, the encrypted delta to create a decrypted delta;
reverting, using the license-key manager, the first poisoned dataset into a first unpoisoned dataset; and
transmitting, using the license-key manager, the first unpoisoned dataset to the authorized user device.

14. The computer program product of claim 8, wherein the program instructions further include program instructions to cause the process to perform operations comprising:
recording every instance of decrypting the encrypted delta.

15. A computer system comprising a processor and one or more computer readable storage media, and program instructions collectively stored on the one or more computer readable storage media, the program instructions executable by the processor to cause the processor to perform operations comprising:
receiving a first original dataset;
modifying the first original dataset to create a first poisoned dataset;
obtaining a delta between the first original dataset and the first poisoned dataset;
encrypting the delta to create an encrypted delta and creating a corresponding encryption key;
decrypting, using the encryption key, the encrypted delta to create a decrypted delta; and
reverting, using the decrypted dela, the first poisoned dataset into the first original dataset.

16. The computer system of claim 15, further comprising program instructions executable by the processor to cause the processor to perform operations comprising:
training a machine learning model to optimally poison data; and wherein the modifying the first original dataset to create the first poisoned dataset comprises inputting the first original dataset into the machine learning model to output the first poisoned dataset.

17. The computer system of claim 16, wherein training the machine learning model further comprises training the machine learning model according to a machine readability of data criterion.

18. The computer system of claim 16, wherein training the machine learning model further comprises training the machine learning model according to a human perceptibility of media criterion.

19. The computer system of claim 15, further comprising program instructions executable by the processor to cause the processor to perform operations comprising:

generating a license-key corresponding to the encrypted delta.

20. The computer system of claim 19, further comprising program instructions executable by the processor to cause the processor to perform operations comprising:

transmitting, using a license-key manager, the license-key to an authorized user device;

transmitting, using the authorized user device, the license-key to the license-key manager;

upon receiving the license-key from the authorized user device, decrypting, using the license-key manager, the encrypted delta to create a decrypted delta;

reverting, using the license-key manager, the first poisoned dataset into a first unpoisoned dataset using the decrypted delta; and transmitting, using the license-key manager, the first unpoisoned dataset to the authorized user device.

* * * * *